(12) United States Patent
Vo

(10) Patent No.: US 6,483,258 B2
(45) Date of Patent: Nov. 19, 2002

(54) INFRARED FIBER OPTIC LIGHT

(75) Inventor: Nam H. Vo, Marysville, OH (US)

(73) Assignee: Honeywell International Inc., Morristown, NJ (US)

( * ) Notice: Subject to any disclaimer, the term of this patent is extended or adjusted under 35 U.S.C. 154(b) by 109 days.

(21) Appl. No.: 09/773,308

(22) Filed: Jan. 31, 2001

(65) Prior Publication Data

US 2002/0153842 A1 Oct. 24, 2002

(51) Int. Cl.[7] .............................. G05F 1/00; G05F 37/02; B64D 39/00
(52) U.S. Cl. .................. 315/291; 315/209 R; 250/495.1
(58) Field of Search ............................. 315/291, 241 R, 315/209 R, 307; 250/495.1, 493.1, 494.1; 244/135 A, 161, 3.16

(56) References Cited

U.S. PATENT DOCUMENTS

| | | | |
|---|---|---|---|
| 2,148,198 A | 2/1939 | Harley | 240/7.7 |
| 2,843,834 A | 7/1958 | Roth et al. | 340/25 |
| 3,710,311 A * | 1/1973 | Avital | 340/815.74 |
| 3,978,342 A * | 8/1976 | Hagen et al. | 250/493.1 |
| 4,398,685 A * | 8/1983 | Task et al. | 244/135 A |
| 4,593,345 A | 6/1986 | Beggs | 362/267 |
| 4,794,500 A | 12/1988 | Bradley | 362/226 |
| 4,868,567 A * | 9/1989 | Eichweber | 244/114 R |
| 4,870,551 A | 9/1989 | Nagel | 362/263 |
| 4,912,334 A * | 3/1990 | Anderson | 250/493.1 |
| 5,647,658 A * | 7/1997 | Ziadi | 362/471 |
| 5,760,711 A * | 6/1998 | Burns | 340/583 |
| 6,388,393 B1 * | 5/2002 | Illingworth | 315/135 |

* cited by examiner

Primary Examiner—Don Wong
Assistant Examiner—Chuc Tran
(74) Attorney, Agent, or Firm—Larry J. Palguta

(57) ABSTRACT

An infrared aircraft light (100) for use with night-vision imaging equipment as an anticollision light. The light uses infrared light sources (112) coupled to a fiber optic cable (114). The infrared light sources (112) are regularly switched on and off by control electronics (200) to generate bursts of infrared light, aiding the prevention of collisions between covert aircraft. The fiber optic cable (114) distributes the infrared light to create a band of light for improved visibility.

30 Claims, 2 Drawing Sheets

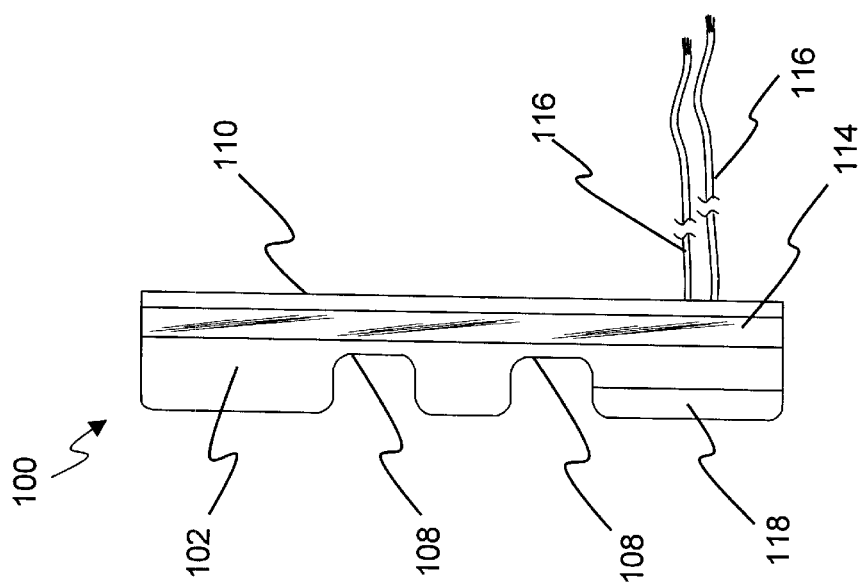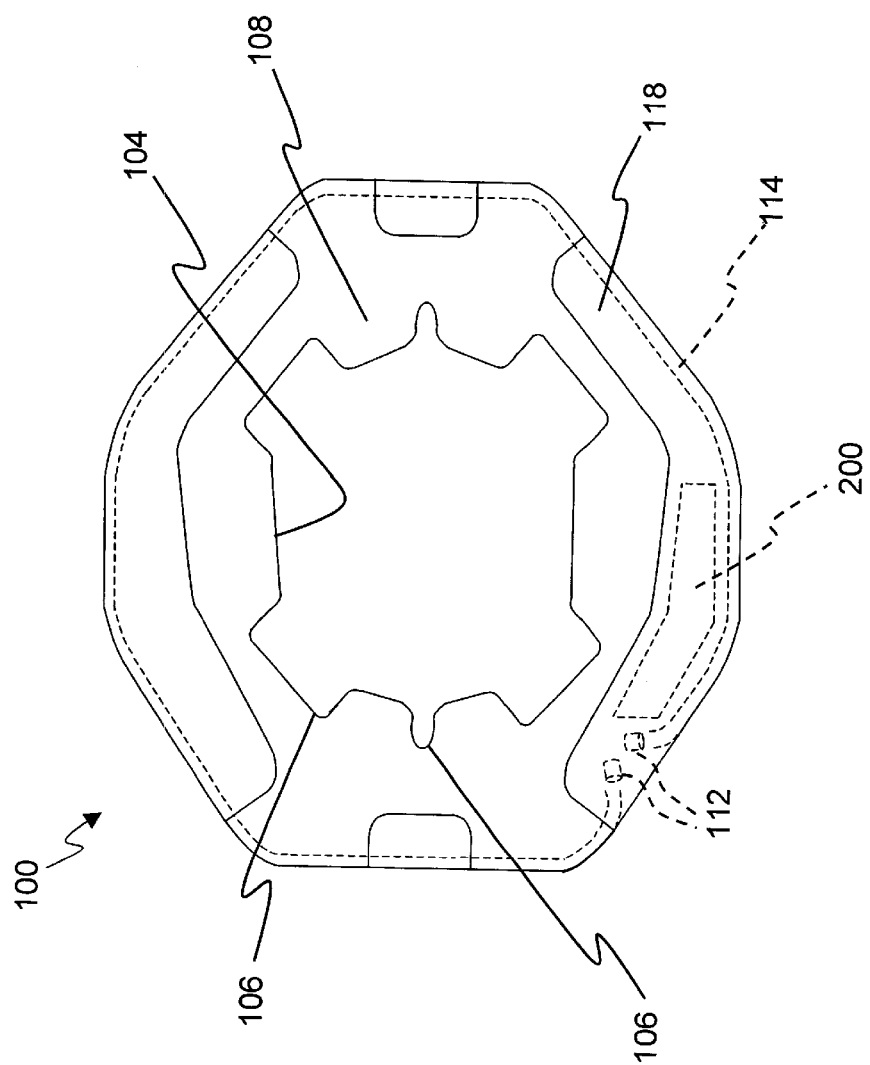

INFRARED FIBER OPTIC LIGHT

BACKGROUND OF THE INVENTION

1. Field of the Invention

This invention relates to an infrared light designed for use with infrared imaging equipment. Specifically, the invention is directed to an infrared light which uses fiber optic cable to distribute the infrared light for improved visibility over the prior art.

2. Description of the Related Art

During covert aircraft night operations, all visible lighting systems on the aircraft are normally turned off to minimize the risk of detection. To compensate for the lack of visible lighting, the aircraft crew uses an infrared imaging system typically referred to as a "night vision imaging system" (NVIS). Night vision imaging systems are designed to amplify infrared light, which is undetectable to the naked eye, and provide a visible display to the user. The invention provides covert anticollision lighting capability when the aircraft's visible lights are turned off by providing an infrared light visible to night vision imaging systems but not to the naked eye.

Infrared lighting systems have previously been installed on aircraft for this purpose, but they suffer from a number of disadvantages. Many require difficult and expensive modification of the aircraft. Other systems are difficult to service. Most importantly, prior systems suffer from insufficient lighting capability due to the nature of the infrared light sources. Infrared light sources are typically solid-state and provide only a small point of light that is easily obstructed. To compensate for this drawback, prior systems use a multitude of light sources. This large number of light sources increases the amount of electrical power required to operate the light, and also adds weight and complexity. There is a need for an infrared light which provides sufficient infrared lighting capability without resorting to a multitude of light sources.

SUMMARY OF THE INVENTION

This invention is directed to an infrared light that provides sufficient infrared lighting capability without the need for a multitude of infrared light sources. The present invention is designed for use as an anticollision light on an aircraft.

Specifically, the present invention includes a low-profile housing structure which minimizes wind resistance. The low-profile housing further includes a sidewall comprised of a series of surfaces of varying length to distribute the infrared light. The low-profile housing structure can also include an opening sized to allow the body of a visible strobe light to pass through the low-profile mounting structure, permitting collocation of the visible strobe light and the infrared light on the aircraft. The low-profile housing structure may also include a recess shaped such that the visible strobe light retains and secures the infrared light between the visible strobe light and the aircraft. It should be noted that while the opening and recess provide a convenient method of mounting the infrared fiber optic light to the aircraft, the opening and recess are not necessary for operation of the infrared fiber optic light. The infrared fiber optic light can be formed in any shape or contour appropriate to the needs of a particular aircraft and mounted separately from any visible strobe light, if desired.

Although only a single solid-state infrared light source is required, several solid-state infrared light sources are included in the present invention for redundancy so that the light will continue to function if one light source should fail. The infrared light sources are optically coupled to a fiber optic cable. The fiber optic cable is arranged to provide a continuous band of infrared light, improving the visibility of the light.

The infrared light sources are electrically connected to a control circuit. The control circuit provides current-limited electrical power to the light sources. The control circuit also turns the infrared light sources on and off, providing bursts of infrared light in a regularly-timed pattern to attract the attention of other nearby covert aircraft and thereby prevent a collision hazard. The control circuit may be mounted within the housing structure, or may be located remotely.

Accordingly, it is an object of this invention to provide an infrared light for use on an aircraft that provides a distributed band of infrared light without the need for a large number of light sources. The invention overcomes this need for a large number of light sources by optically connecting the infrared light sources to a fiber optic cable. The fiber optic cable is arranged around the sidewall of the light. A control circuit flashes the infrared light sources on and off. The resulting bursts of light are distributed through the fiber optic cable, emitting an attention-getting band of infrared light.

The present invention comprises an infrared fiber optic light for use on an aircraft, comprising: a housing structure having an exterior surface; an infrared light source optically connected to a fiber optic cable, said infrared light source being located at said housing structure, and said fiber optic cable being arranged at said exterior surface and forming a continuous band for emission of infrared light beyond said infrared fiber optic light; and a control circuit for controlling the amount of electrical current applied to said infrared light source and regularly interrupting the electrical current to cause said infrared light source to flash.

These and other features will become better understood with reference to the following description, appended claims, and accompanying drawings.

BRIEF DESCRIPTION OF THE DRAWINGS

FIGS. 1-a and 1-b are top and side views of the infrared fiber optic light, and

DETAILED DESCRIPTION OF THE INVENTION

Figure 2:
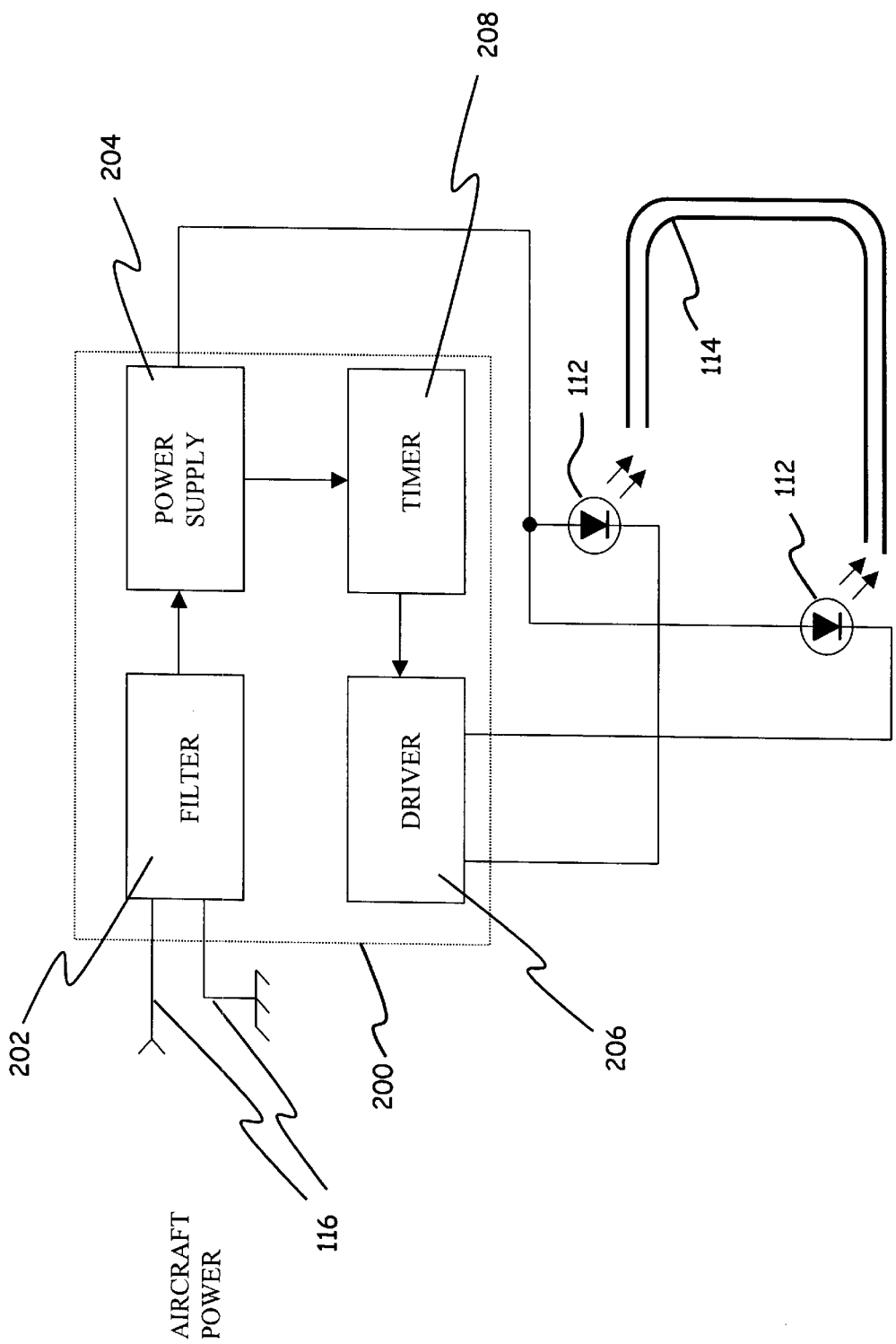
FIG. 2 is a block diagram of the control circuit.

The following terms have meanings as described. "Strobe light" refers to a regularly-timed, short burst of light. A strobe light is intended to attract the attention of others in the proximity of the aircraft, primarily other aircraft for the purpose of preventing collisions between aircraft operating in the same airspace. "Anticollision light" is analogous to "strobe light." An anticollision light is a strobe light that is utilized for the purpose of preventing collisions between aircraft operating in the same airspace. The anticollision light attracts the attention of other aircraft in the vicinity, thus giving other aircraft greater time to see and avoid the aircraft utilizing the anticollision light. "Infrared light" refers generally to a region of the electromagnetic spectrum outside the visual range of humans, but detectable by equipment capable of converting the infrared light into a corresponding image visible to humans. Infrared light sources and imaging equipment are typically used to facilitate covert night operations by providing vision capability in near to total darkness conditions. "Mounting plan" is a term for the pattern of holes or other attachment means on an object, intended to be used to mount or install that object.

As shown generally by FIGS. 1-a and 1-b, the infrared light 100 can include a low-profile housing 102, shaped to minimize wind resistance and distribute the infrared light. The housing 102 may include an opening 104. The opening 104 is sized to permit the body of a visible strobe light to pass through the housing 102. The opening 104 includes an irregular shape providing a plurality of notches 106. The notches 106 are placed in a pattern which matches the mounting plan for the visible strobe light. The recess 108 is shaped to permit placement of the housing 102 between a visible strobe light and the aircraft surface, securing the infrared light to the aircraft. The surface of the recess 108 may be contoured to match the mounting surface or flange of the visible strobe light for a weathertight fit. In the embodiment shown, the housing 102 has a lower surface 110 which is contoured to match the surface of the aircraft.

Infrared light sources 112 are placed inside the housing 102 such that their light output is directed into the fiber optic cable 114. Infrared light sources 112 may be replaced as separate units to simplify maintenance. Electrical wiring 116 supplies power to the control circuit 200 from the aircraft's electrical supply. The control circuit 200 may be placed within housing 102, or may optionally be mounted remotely from said housing. The housing 102 includes a removable cover 118 that is used to protect the infra red light sources 112 and the control circuit 200 from the environment.

As shown in FIG. 2, electrical power for the control circuit 200 is provided to a filter 202 by electrical wiring 116. The high-voltage protection filter 202 isolates electrical noise between the aircraft and control circuit 200. The power supply 204, such as a voltage regulator, conditions the power from the aircraft to a voltage level suitable for the components in control circuit 200. The driver 206, such as a current limiter, controls the amount of current supplied to the infrared light sources 112. The timer 208 controls the on-off timing of the infrared light sources 112, causing a regularly-timed burst of light to be emitted from the infrared light sources 112.

The infrared light sources 112 emit a point source of infrared light, which is diffused and distributed by the fiber optic cable 114. Light sources 112 are connected to respective ends of fiber optic cable 114 to provide multiple sources of light to the fiber optic cable for improved reliability in the event that a single light source were to fail. However, a single infrared light source 112 may be utilized if desired. Additional light sources and fiber optic cables provide assemblies that may be optionally utilized to provide further redundancy.

In operation, the infrared light is mounted to an appropriate exterior surface of an aircraft. Electrical power from the aircraft is connected to the control circuit 200. The control circuit 200 turns the infrared light sources on and off in a regularly-timed pattern, causing bursts of infrared light to be distributed through the fiber optic cable 114 and emitted. The bursts of emitted infrared light serve to attract the attention of air crews during covert operations, aiding the prevention of collisions between covert aircraft.

What is claimed is:

1. An infrared fiber optic light for use on an aircraft, comprising:

a housing structure having an exterior surface;

an infrared light source optically connected to a fiber optic cable, said infrared light source being located at said housing structure, and said fiber optic cable being arranged at said exterior surface and forming a continuous band for emission of infrared light beyond said infrared fiber optic light; and a control circuit for controlling the amount of electrical current applied to said infrared light source and regularly interrupting the electrical current to cause said infrared light source to flash.

2. An infrared fiber optic light for use on an aircraft, comprising:

a housing structure, said housing structure having upper and lower surfaces and a sidewall, wherein said sidewall is a series of surfaces of varying lengths;

an infrared light source optically connected to a fiber optic cable, said infrared light source being located at said housing structure, and said fiber optic cable being arranged around said sidewall of said housing and forming a continuous band for emission of infrared light; and a control circuit for controlling the amount of electrical current applied to said infrared light source and regularly interrupting the electrical current to cause said infrared light source to flash.

3. The infrared fiber optic light of claim 2, further including an opening in the housing structure to permit a visible strobe light to pass through said opening and for effecting mounting of the infrared fiber optic light and said visible strobe light onto the aircraft.

4. The infrared fiber optic light of claim 3, wherein the housing structure includes a recessed surface contoured to match the shape of said visible strobe light.

5. The infrared fiber optic light of claim 4, wherein said opening includes notches matching a mounting plan of said visible strobe light to permit mounting of said infrared fiber optic light and said visible strobe light onto an aircraft using mounting hardware for said visible strobe light.

6. The infrared fiber optic light of claim 3, wherein said opening includes notches matching the mounting plan of said visible strobe light to permit mounting of said infrared fiber optic light and said visible strobe light onto an aircraft using mounting hardware for said visible strobe light.

7. The infrared fiber optic light of claim 2, wherein said control circuit is located inside said housing structure.

8. The infrared fiber optic light of claim 2, wherein said control circuit is located remotely from said housing structure.

9. The infrared fiber optic light of claim 2, wherein said infrared light source is replaceable as a unit.

10. The infrared fiber optic light of claim 2, wherein the housing includes a cover to protect said infrared light source and said control circuit from the environment.

11. The infrared fiber optic light of claim 2, wherein the infrared fiber optic light includes a plurality of infrared light sources.

12. The infrared fiber optic light of claim 11, wherein more than one infrared light source is located at one end of the fiber optic cable.

13. The infrared fiber optic light of claim 11, wherein one infrared light source is located at each end of the fiber optic cable.

14. The infrared fiber optic light of claim 11, wherein more than one infrared light source is located at each end of the fiber optic cable.

15. The infrared fiber optic light of claim 11, wherein the infrared fiber optic light includes a plurality of fiber optic cables.

16. An infrared fiber optic light for use on an aircraft, comprising:

a housing structure comprising upper and lower surfaces and a sidewall which is a series of surfaces of varying lengths, an opening to permit a visible strobe light to pass through said opening, the opening including notches matching a mounting plan of said visible strobe light to permit mounting of said infrared fiber optic light and visible strobe light onto an aircraft using mounting hardware for said visible strobe light, and a recessed surface contoured to match the shape of said visible strobe light;

an infrared light source optically connected to a fiber optic cable, said infrared light source being located at said housing structure and replaceable as a unit, and said fiber optic cable being arranged around said sidewall of said housing and forming a continuous band for emission of infrared light; and a control circuit for controlling the amount of electrical current applied to said infrared light source and regularly interrupting the electrical current to cause said infrared light source to flash.

17. A process of providing an infrared fiber optic light for use on a vehicle, comprising:

providing a housing structure having an exterior surface;

placing at said housing structure an infrared light source optically connected to a fiber optic cable, said fiber optic cable being arranged at said exterior surface of said housing and forming a band for emission of infrared light beyond said infrared fiber optic light; and including a control circuit for controlling the amount of electrical current applied to said infrared light source and regularly interrupting the electrical current to cause said infrared light source to intermittently emit infrared light.

18. The process of claim 17, further comprising the steps of including an opening at said infrared fiber optic light and extending a visible strobe light through said opening.

19. The process of claim 18, further comprising the step of mounting together the infrared fiber optic light and said visible strobe light onto the vehicle which comprises an aircraft.

20. The process of claim 18, further comprising the step of including at the opening notches matching a mounting plan of said visible strobe light to permit mounting of said infrared fiber optic light and said visible strobe light onto the vehicle using mounting hardware for said visible strobe light.

21. The process of claim 17, further comprising the step of locating said control circuit inside said housing structure.

22. The process of claim 17, further comprising the step of locating said control circuit remotely from said housing structure.

23. The process of claim 17, further comprising the step of replacing said infrared light source as a unit.

24. The process of claim 17, further comprising the step of providing the housing with a cover to protect said infrared light source and said control circuit from the environment.

25. The process of claim 17, further comprising the step of providing the infrared fiber optic light with a plurality of infrared light sources.

26. The process of claim 25, further comprising the step of providing more than one infrared light source at one end of the fiber optic cable.

27. The process of claim 25, further comprising the step of locating one infrared light source at each end of the fiber optic cable.

28. The process of claim 25, further comprising the step of locating more than one infrared light source at each end of the fiber optic cable.

29. The process of claim 25, further comprising the step of providing the infrared fiber optic light with a plurality of fiber optic cables.

30. A process of providing an infrared fiber optic light for use on an aircraft, comprising the steps of:

providing a housing structure comprising upper and lower surfaces and a sidewall which is a series of surfaces of varying lengths, an opening permitting a visible strobe light to extend through said opening, the opening including notches matching a mounting plan of said visible strobe light to permit mounting of said infrared fiber optic light and said visible strobe light onto the aircraft using mounting hardware for said visible strobe light, and a recessed surface contoured to match the shape of said visible strobe light;

placing at said housing structure an infrared light source optically connected to a fiber optic cable, said fiber optic cable being arranged at said sidewall of said housing and forming a band for emission of infrared light beyond said infrared fiber optic light; and locating said control circuit inside said housing structure and for controlling the amount of electrical current applied to said infrared light source and regularly interrupting the electrical current to cause said infrared light source to intermittently emit infrared light.

* * * * *